United States Patent [19]
Kim

[11] Patent Number: 5,809,117
[45] Date of Patent: Sep. 15, 1998

[54] DTMF TRANSMISSION AND DISPLAYING METHOD FOR FACSIMILE SYSTEM

[75] Inventor: Eog-Kyu Kim, Daegukwangyeok, Rep. of Korea

[73] Assignee: SamSung Electronics Co., Ltd., Kyungki-do, Rep. of Korea

[21] Appl. No.: 747,589

[22] Filed: Nov. 8, 1996

[30] Foreign Application Priority Data

Nov. 8, 1995 [KR] Rep. of Korea ................. 95/40224

[51] Int. Cl.⁶ ................................................ H04M 11/00
[52] U.S. Cl. ................................ 379/100.14; 379/100.01; 379/355
[58] Field of Search ................ 379/100.01, 100.03, 379/100.06, 100.14, 352, 354, 355, 110.01, 100.05, 100.12

[56] References Cited

U.S. PATENT DOCUMENTS

| | | |
|---|---|---|
| 4,868,852 | 9/1989 | Tsumura . |
| 4,939,767 | 7/1990 | Saito et al. . |
| 5,067,150 | 11/1991 | Satomi et al. . |
| 5,136,634 | 8/1992 | Rae et al. . |
| 5,323,246 | 6/1994 | Kotani et al. . |
| 5,440,619 | 8/1995 | Cann . |
| 5,490,210 | 2/1996 | Sasso . |
| 5,555,100 | 9/1996 | Bloomfield et al. . |
| 5,680,449 | 10/1997 | Terajima et al. ................. 379/355 |

*Primary Examiner*—Curtis A. Kuntz
*Assistant Examiner*—Stephen W. Palan
*Attorney, Agent, or Firm*—Robert E. Bushnell, Esq.

[57] ABSTRACT

A DTMF transmission method for a facsimile system which comprises an operating panel for generating key data according to operation of numeric keys, a dialing section of a telephone for receiving numeric key data from the operating panel and thus generating a DTMF signal, and a modem for detecting the DTMF signal received from the dialing section. The method comprises the steps of detecting the DTMF signal with the modem while power is supplied to the facsimile system and the telephone is in its hook-off state, displaying a telephone number corresponding to the detected DTMF signal, and storing the telephone number corresponding to the detected DTMF signal.

9 Claims, 3 Drawing Sheets

DTMF TRANSMISSION AND DISPLAYING METHOD FOR FACSIMILE SYSTEM

CROSS-REFERENCE TO RELATED APPLICATION

This application makes reference to, incorporates the same herein, and claims all benefits accruing under 35 U.S.C. §119 from an application for DTMF Transmission And Displaying Method For Facsimile System earlier filed in the Korean Industrial Property Office on Nov. 8, 1995, and there duly assigned Ser. No. 40224/1995.

BACKGROUND OF THE INVENTION

1. Technical Field

The present invention relates to a dual-tone multi-frequency transmission and displaying method for a facsimile system, and more particularly, relates to a transmission and displaying of a telephone number of a destination while power is supplied to the facsimile system and its transceiver is in its hook-off state.

2. Background Art

Generally, a facsimile system having facsimile and telephone functions as disclosed in, for example, U.S. Pat. No. 4,908,851 for Facsimile Apparatus Operable In Facsimile Or Conversation Mode issued to Kotani et al., U.S. Pat. No. 5,2,55,311 for Data Communication Apparatus issued to Yoshida, and U.S. Pat. No. 5,487,105 for Facsimile Apparatus Operable In Facsimile Or Telephone Mode issued to Sakai, is well known in the communication art for selectively operating between a facsimile mode and a telephone mode. Typical facsimile systems such as disclosed in U.S. Pat. No. 5,067,150 for Telephone Number Display Device issued to Satomi et al., U.S. Pat. No. 5,241,595 for Communication Control Section For Facsimile Equipment Having A Secure Communication Function issued to Kuno, include an operating panel having a key input unit for allowing a user to dial a telephone number of a desired destination and a display unit for display such a telephone number.

In such a conventional facsimile system having an attached telephone, the modem is configured as shown, for example, in U.S. Pat. No. 4,939,767 for System And Method For Transmitting Image Data On A Telephone Network Or Equivalent issued to Saito et al., and U.S. Pat. No. 5,440,619 for Voice, Data And Facsimile Modem With Modified Ringback Answering issued to Cann, to convert key data corresponding to key input into a unique dual-tone multi-frequency signal and transmit the same through a telephone line. In the conventional modem's DTMF transmission as described, I have observed that the DTMP transmission tone is produced through a speaker of the facsimile system rather than through the receiver of the telephone. Unfortunately, this requirement generates undesirable noise during the operation of the facsimile system. In addition, a relay drive sound is also undesirably generated in response to the switching of the relay to the modem every time of the DTMF transmission occurs. This requirement also shortens the lifespan of the relay.

SUMMARY OF THE INVENTION

Accordingly, it is therefore an object of the present invention to provide an improved facsimile system having an internal modem and an externally attached telephone.

It is another object to provide a facsimile system having an externally attached and parallelly connected telephone capable of generating a dual-tone multi-frequency signal corresponding to an input telephone number while a power source is supplied to the facsimile system and the telephone is in a hook-off state.

It is also an object to provide a process of displaying a dual-tone multi-frequency signal on an operating panel of a facsimile system transmitted from a dialing section of a parallel-connected telephone.

It is still another object to provide a process of producing a dual-tone multi-frequency transmission tone in a receiver of a parallelly connected telephone of a facsimile system in response to a dialing function in the dialing section of the telephone.

These and other objects of the present invention can be achieved by a facsimile system including an operating panel for generating key data according to an operation of numeric keys, a dialing section of an externally attached telephone for receiving figure-key data from the operating panel and generating a dual-tone multi-frequency signal, and a modem for detecting the dual-tone multi-frequency signal received from the dialing section. The dual-tone multi-frequency method for a facsimile system includes the steps: receiving key data, in the telephone, from a key input unit of the operating panel in response to user's depression of a telephone number of a desired destination via the key input unit; generating a dual-tone multi-frequency signal, in the telephone, in response to reception of the key data; detecting the dual-tone multi-frequency signal, in the modem while a power source is supplied to drive the facsimile system and the telephone is in a hook-off state; providing a visual display of a telephone number corresponding to a detected dual-tone multi-frequency signal on a display unit of the operating panel, when the dual-tone multi-frequency signal is detected by the modem; and storing the telephone number corresponding to the detected dual-tone multi-frequency signal in a data memory, when the dual-tone multi-frequency signal is detected by the modem.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
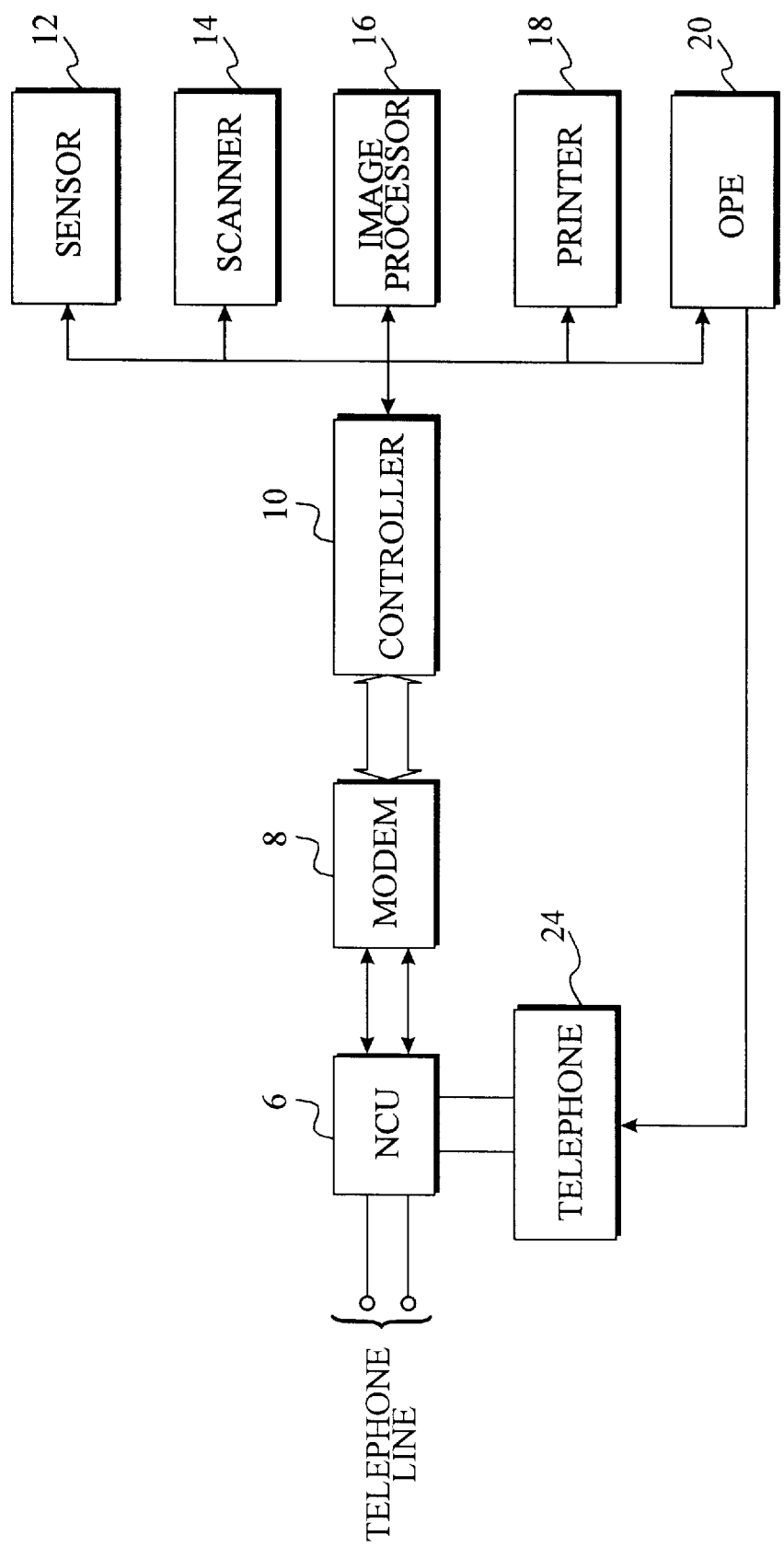
FIG. 1 is a block diagram illustrating a facsimile system constructed according to the principles of the present invention.

Referring now to the drawings and particularly to FIG. 1, which illustrates a facsimile system constructed according to the principles of the present invention. The facsimile system includes a controller 10 for controlling operations of the facsimile system, a network control unit NCU 6 connected to a tip and ring terminal of a telephone line, a modem 8, a sensor 12, a scanner 14, an image processor 16, a printer 18, an operational panel OPE 20 and a telephone 24.

The controller 10 contains a central processing unit CPU, a program memory such as a ROM (not shown) which stores programs for the CPU to control the general operation of the facsimile system for transmission or reception of image data from another facsimile system, and a data memory such as a RAM (not shown) which temporarily stores various items of information. An application program for enabling the facsimile system constructed according to the present invention to store the input dual-tone multi-frequency DTMF signal from a modem 8 in the data memory for a subsequent visual display on the OPE 20.

The OPE 20 includes a key input unit and a display unit. The key input unit of the OPE 20 comprises numeric keys for generating key data to the controller 10 to dial a telephone number of a counterpart communication device such as a facsimile system. The display unit of the operational panel 20 is controlled by the controller 10 so as to display a telephone number corresponding to the DTMF signal in addition to displaying data indicating a mode of operation of the facsimile system. The sensor 12 senses whether a document is input into the facsimile system, or whether copy paper is stored and available for use, and generates an indicative signal to the controller 10. The scanner 14 transports and scans an image of the input document and then generates image data corresponding to the scanned image. The image processor 16 processes the image data output from the scanner 14 in order to generate processed image data for either transmission via a telephone line or copy during the copy mode under control of the controller 10, and processes the image signal received from a telephone line during the reception mode. The printer 18 prints the image data received from the image processor 16 on a printable medium such as individual cut sheets of papers during the reception mode and the copy mode under the control of the controller 10. The modem 8 modulates the image data output from the image processor 16 into a modulated image signal for transmission, duplicates the image signal input to the image processor 16 during the reception mode under the control of the controller 10, and transmits the DTMF signal received through a telephone line to the controller 10. The NCU 6 is connected with the telephone line to form transmission and reception paths for the modem 8 under the control of the controller 10.

Figure 2:
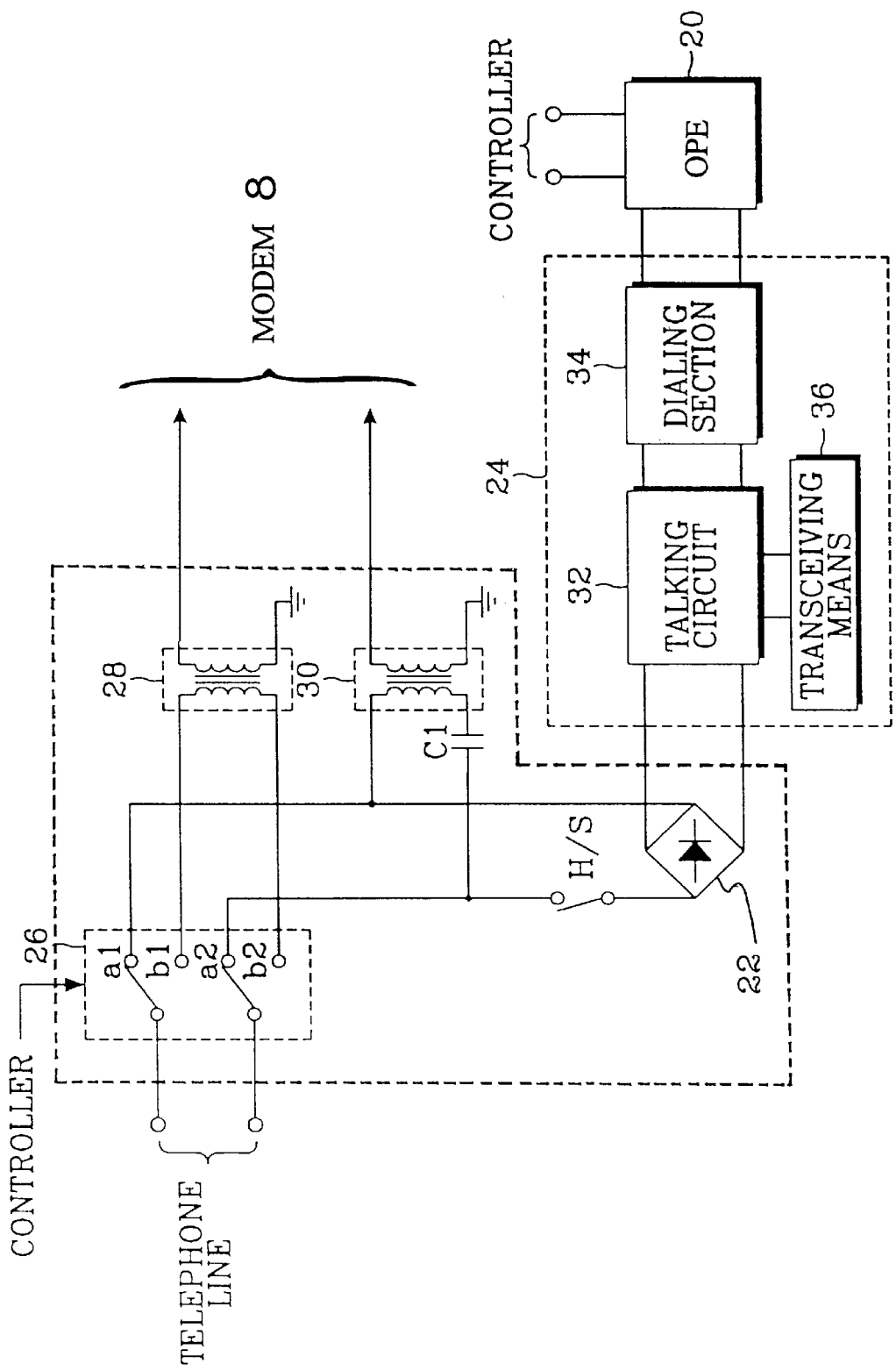
FIG. 2 is a circuit diagram of a dual-tone multi-frequency transmission and its display in a facsimile system constructed according to the principles of the present invention.

Turning now to FIG. 2, which illustrates a dual-tone multi-frequency transmission and its display in a facsimile system constructed according to the principles of the present invention. The NCU 6 includes a relay 26 connected to the telephone line, a bridge 22 connected between the relay 26 and the telephone 24 and a first and second transformers 28 and 30 connected respectively between the relay 26 and the modem 8. The telephone 24 is connected to first input terminals a1 and a2 of the relay 26, and the facsimile system is connected to second input terminals b1 and b2 of the relay 26. While transmitting and receiving a document through the facsimile system, the relay 26 is switched to the second input terminals connected to the facsimile system. The first transformer 28 is connected to the second input terminals b1 and b2 of the relay 26 so as to transmit input/output image data to the facsimile system. The second transformer 30 is connected to the first input terminals a1 and a2 of the relay 26 so as to transmit a DTMF signal received from the telephone to a modem 8 through a telephone line.

The telephone 24 contains a talking circuit 32 connected to the first input terminals a1 and a2 of the relay 26 for transmitting a DTMF signal received from a dialing section 34 to the telephone line. The dialing section 34 is provided to generate the DTMF signal corresponding to the numeric key data operated by the OPE 20. The OPE 20 has a set of numeric keys so as to generate numeric key data when the numeric keys are pressed by the user. When a transceiving means 36 of the telephone is in its hook-off state, the controller 10 ignores the numeric key data provided from the OPE 20 and considers the DTMF signal provided through the modem 8 as numeric key data. The transceiving means 36 then produces a DTMF transmission tone generated according to the DTMF signal through its receiver.

Figure 3:
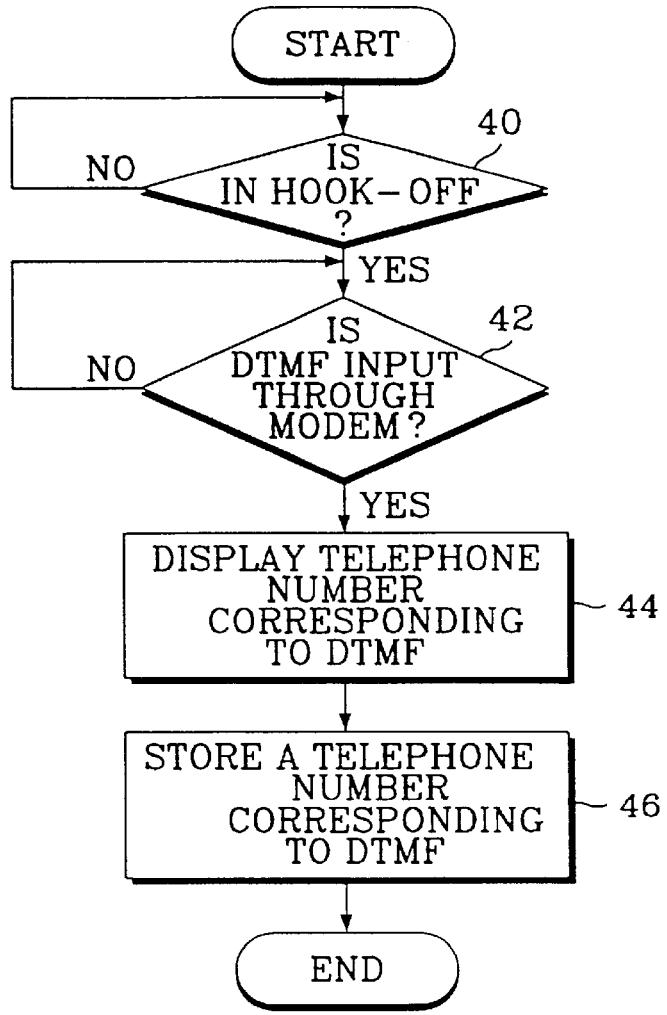
FIG. 3 is a control flow chart illustrating a dual-tone multi-frequency transmission and its display in a facsimile system according to the present invention.

FIG. 3 is a control flow chart illustrating a dual-tone multi-frequency transmission and its display in a facsimile system according to the present invention. The DTMF signal is first detected from the modem while power is supplied to the facsimile system and the telephone is in its hook-off state. A telephone number corresponding to the detected DTMF signal is then displayed on the display unit of the OPE 20 and concurrently stored in the data memory when the DTMF signal is input through the modem.

Figure 4:
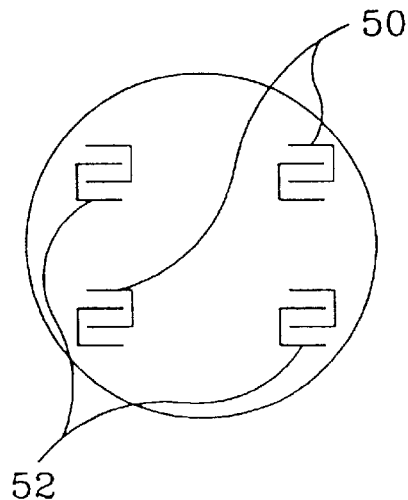
FIG. 4 illustrates a key structure of the key input section.

FIG. 4 is a cross sectional view illustrating an internal connection shows a key structure of the OPE 20 in which each key, i.e., button has four contact points. When each key is pressed by the user, the four contact points are respectively contacted so that key data corresponding to the pressed key is input to the dialing section 34 of the telephone 24 via contact points 50 while the same key data is input to the controller 10 via contact points 52.

With references to FIG. 1 to FIG. 3, the preferred embodiment of the present invention will be described as follows.

First, the controller 10 determines whether the transceiving means 36 of the telephone 24 is in its hook-off state when the power source is supplied to drive the facsimile system at step 40 as shown in FIG. 3. When the transceiving means 36 is in its hook-off state, the controller 10 determines whether a DTMF signal corresponding to a telephone number is received through the modem 8 at step 42.

In order to describe the process of detecting the DTMF signal, the OPE 20 outputs the key data corresponding to pressed numeric keys to the dialing section 34 of the telephone 24 via contact points 50 and the controller 10 via the contact points 52 as shown in FIG. 4. The controller 10 ignores the key data that is received from the OPE 20. The dialing section 34 of the telephone 24 then generates a DTMF signal corresponding to the input key data from the OPE 20. The output DTMF signal is transmitted to the telephone line through the talking circuit 32 of the telephone. Also, the DTMF transmission tone which is generated during the transmission of the DTMF signal is produced through the receiver of the transceiving means 36 provided inside the telephone 24. The DTMF signal is then provided to the modem 8 through the second transformer 30 so as to be subsequently transmitted to the telephone line.

When the DTMF signal is detected from the modem 12 at step 42, the controller 10 controls the visual display of the telephone number corresponding to the input DTMF signal on the display unit of the OPE 20 at step 44. In addition, the controller 10 also stores the telephone number displayed on the display unit of the OPE 20 in the data memory provided therein at step 46.

As described above, when the user inputs numeric keys while the transceiving means of the telephone is in a hook-off state and the power source is supplied to drive the facsimile system, the telephone performs a dial function corresponding to the input numeric keys. Therefore, the DTMF transmission tone is produced always through the transceiving means. Moreover, since the relay need not be switched so often, its life span is prolonged and the drive noise is advantageously removed. The present invention allows the user to confirm a telephone number to call because the transmitted DTMF signal is provided to the controller through the modem.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the appended claims. In the claims, means-plus-function clause are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A dual-tone multi-frequency transmission method for a facsimile system having an internal modem and an externally attached telephone, comprising the steps:
    receiving key data, in said telephone, from a key input unit of an operating panel in response to user's depression of a telephone number of a desired destination via said key input unit;
    generating a dual-tone multi-frequency signal, in said telephone, in response to reception of said key data while a power source is supplied to the facsimile system and the telephone is off hooked;
    detecting the dual-tone multi-frequency signal, in said modem, for beginning to establish communication with a remote communication device;
    providing a visual display of a telephone number corresponding to a detected dual-tone multi-frequency signal on a display unit of the operating panel, when the dual-tone multi-frequency signal is detected by said modem; and
    storing the telephone number corresponding to the detected dual-tone multi-frequency signal in a data memory, when the dual-tone multi-frequency signal is detected by said modem.

2. The method of claim 1, further comprised of the telephone generating a dual-tone multi-frequency transmission tone to said remote communication device via a telephone line.

3. A dual-tone multi-frequency transmission method for a facsimile system comprising a parallelly connected telephone, an internal modem, and an operating panel for generating key data according to operation of numeric keys, said method comprising the steps of:
    generating a dual-tone multi-frequency signal, in said telephone, in response to reception of said key data while a power source is supplied to the facsimile system and the telephone is off hooked;
    detecting the dual-tone multi-frequency signal, in said modem for beginning to establish communication with a remote communication device;
    providing a visual display of a telephone number corresponding to a detected dual-tone multi-frequency signal on a display unit of the operating panel, when the dual-tone multi-frequency signal is detected by the modem; and
    concurrently storing the telephone number corresponding to the detected dual-tone multi-frequency signal in a data memory, when the dual-tone multi-frequency signal is detected by the modem.

4. The method of claim 3, further comprised of the telephone generating a dual-tone multi-frequency transmission tone to said remote communication device via a telephone line.

5. A facsimile system having an externally attached and parallelly connected telephone, comprising:
    a tip and a ring terminal coupled to a telephone line;
    a relay switch operable between a first position for connecting the telephone line with a modem to establish facsimile communication and a second mode for connecting the telephone line with the telephone to establish telephonic communication;
    a first transformer disposed between the relay switch and the modem;
    a second transformer disposed between the telephone and the modem;
    a memory for storing therein data representing a telephone number of a desired destination;
    an operating panel including a display unit and a key unit for allowing a user to control operation of the facsimile system;
    said telephone connected to the relay switch and contained therein a dual-tone multi-frequency generator for generating a dual-tone multi-frequency signal in response to the user's input telephone number of the desired destination;
    a controller for controlling the telephone to generate said dual-tone multi-frequency signal in response to reception of key data from the operating panel while a power source is supplied to the facsimile system and the telephone is off hooked, for controlling the modem to detect said dual-tone multi-frequency signal to begin communication with a remote communication device, and for controlling a visual display of a telephone number corresponding to a detected dual-tone multi-frequency signal on the display unit of the operating panel and a storage of the telephone number corresponding to the detected dual-tone multi-frequency signal in said memory.

6. The facsimile system of claim 5, further comprised of said remote communication system representing one of a remote facsimile system having an attached telephone and a remote telephone.

7. The facsimile system of claim 5, further comprising:
    a sensor for sensing whether a document is input into the facsimile system, or whether a copy paper is stored for use in the facsimile system;
    a scanner for transporting and scanning an image of the input document and then generating image data corresponding to the scanned image;
    an image processor for processing the image data output from the scanner to generate processed image data for either transmission via the telephone line or copy during a copy mode under control of the controller and for processing the image signal received from the telephone line during a reception mode; and
    a printer for printing the image data received from the image processor on a printable medium during the reception mode and the copy mode under the control of the controller.

8. The facsimile system of claim 5, further comprised of the telephone generating a dual-tone multi-frequency transmission tone to said remote communication device via the telephone line.

9. The facsimile system of claim 7, further comprised of the telephone generating a dual-tone multi-frequency transmission tone to said remote communication device via the telephone line.

* * * * *